No. 825,497. PATENTED JULY 10, 1906.
J. W. STEPHENS.
APPARATUS FOR OPERATING COVERS OF LOCK BOXES, &c.
APPLICATION FILED JULY 23, 1904.

3 SHEETS—SHEET 1.

Witnesses
Lindsay L. B. Little
Margaret Hughes

Inventor
Joseph W. Stephens
by W. G. Doolittle
Attorney

No. 825,497. PATENTED JULY 10, 1906.
J. W. STEPHENS.
APPARATUS FOR OPERATING COVERS OF LOCK BOXES, &c.
APPLICATION FILED JULY 23, 1904.

3 SHEETS—SHEET 2.

Witnesses
Lindsay W. B. Little
Margaret Hughes

Inventor
Joseph W. Stephens
by W. G. Dooley
Attorney

No. 825,497. PATENTED JULY 10, 1906.
J. W. STEPHENS.
APPARATUS FOR OPERATING COVERS OF LOCK BOXES, &c.
APPLICATION FILED JULY 23, 1904.
3 SHEETS—SHEET 3.
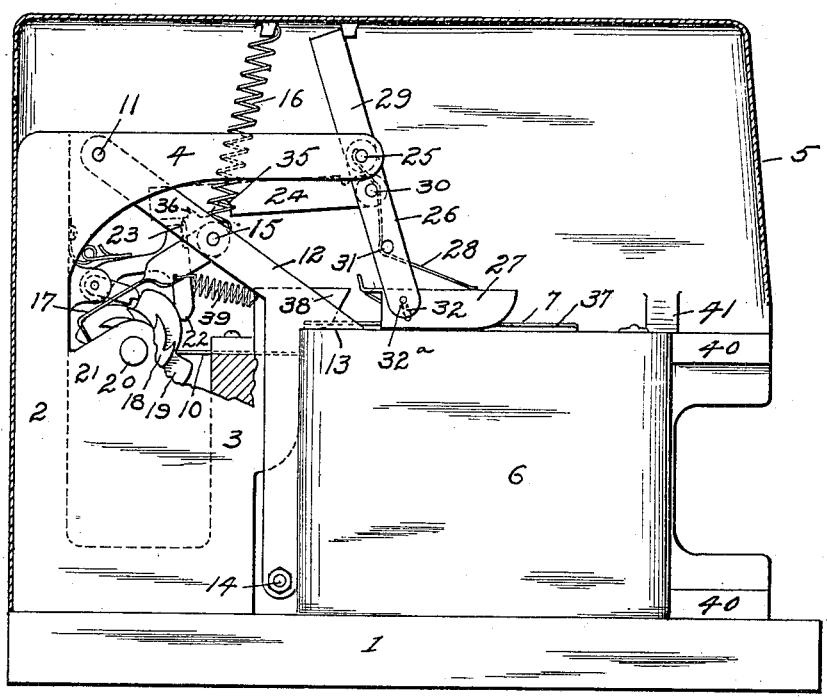
Fig. 4
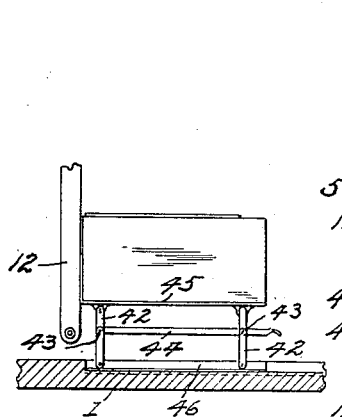
Fig. 10
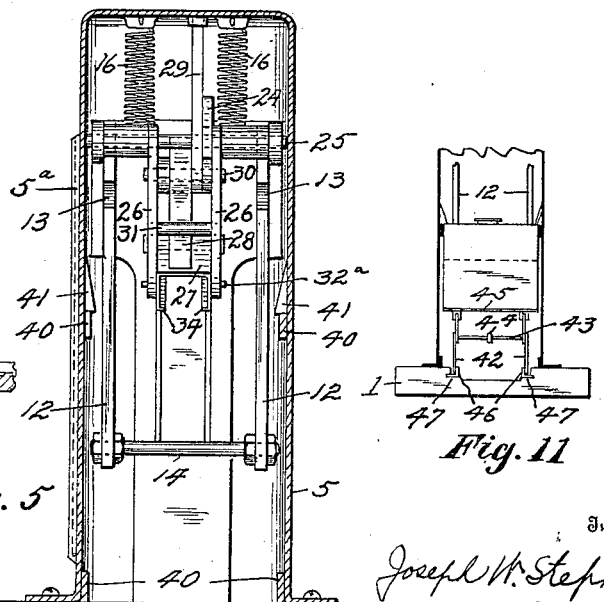
Fig. 5
Fig. 11
Witnesses
Lindsay deB. Little
Margaret Hughes
Inventor
Joseph W. Stephens
by W. G. Doolittle
Attorney

UNITED STATES PATENT OFFICE.

JOSEPH W. STEPHENS, OF PITTSBURG, PENNSYLVANIA.

APPARATUS FOR OPERATING COVERS OF LOCK-BOXES, &c.

No. 825,497. Specification of Letters Patent. Patented July 10, 1906.

Application filed July 23, 1904. Serial No. 217,893.

*To all whom it may concern:*

Be it known that I, JOSEPH W. STEPHENS, a citizen of the United States, residing at Pittsburg, in the county of Allegheny and State of Pennsylvania, have invented new and useful Improvements in Apparatus for Operating Covers of Lock-Boxes, &c., of which the following is a specification.

This invention relates to an apparatus particularly designed for use in connection with a receptacle provided with a lock and a removable lid or cover, such a receptacle, for example, as a savings-bank.

Among the objects of my invention are to provide new and improved means for unlocking and removing the lid or cover from the receptacle, replacing the lid on the receptacle, and locking it thereto.

Figure 1:
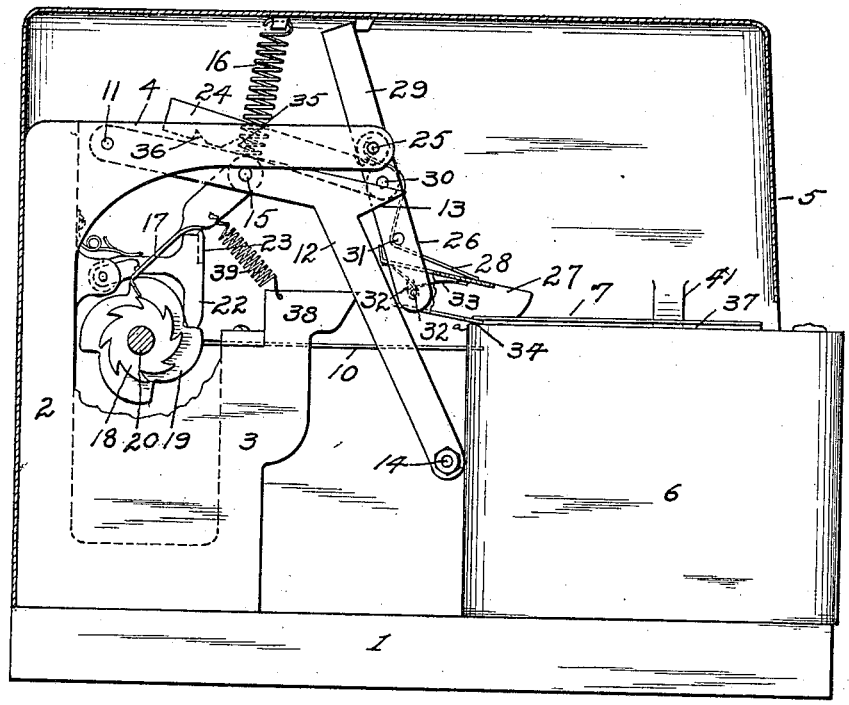
Figure 2:
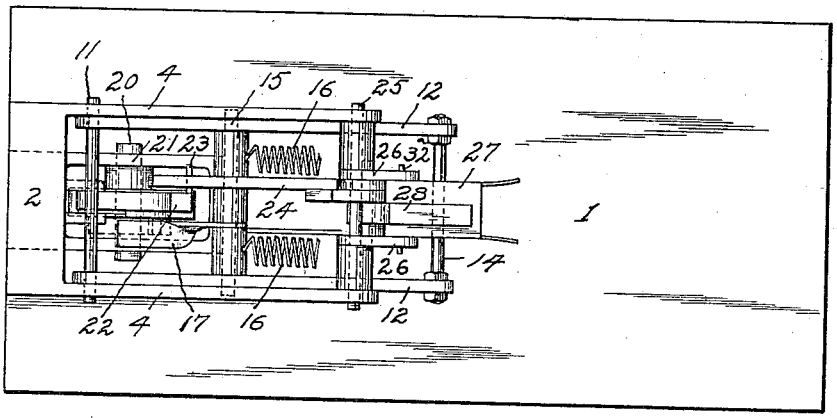
Figure 3:
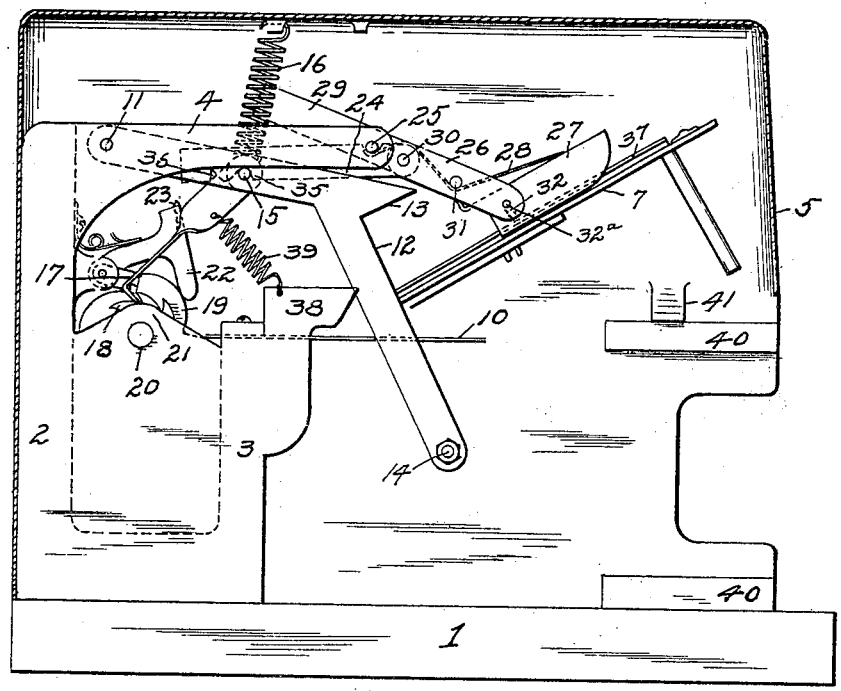
Figure 6:
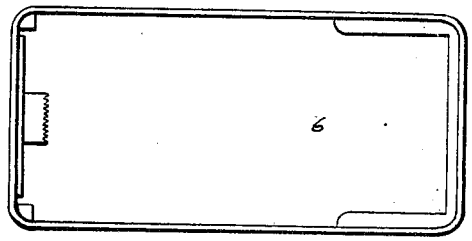
Figure 7:
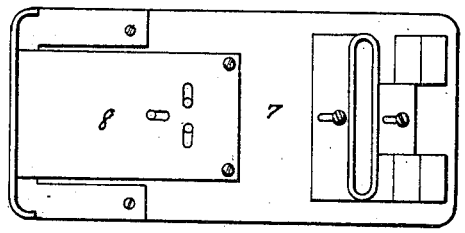
Figure 8:
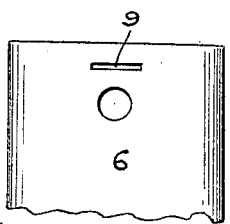
Figure 9:
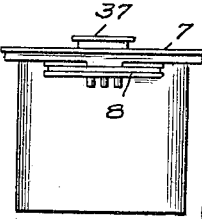

In the accompanying drawings, which illustrate an application of my invention, Figure 1 is a side elevational view of an apparatus constructed in accordance with my invention, showing a portion of the casing and a receptacle in position preparatory to unlocking and removing the lid or cover therefrom; Fig. 2, a plan; Fig. 3, a side elevational view showing the lid or cover raised from the receptacle; Fig. 4, a similar view showing position of the parts during operation of replacing the lid or cover and locking same; Fig. 5, a front end view; Figs. 6, 7, 8, and 9, detail views of receptacle, and Figs. 10 and 11 detail views of means for adapting the apparatus to be used for receptacles of different sizes.

Referring to the drawings, my apparatus is illustrated, and, as preferred, consists of a framework formed of a single casting comprising a base portion 1, upright supporting members 2 and 3, and longitudinally-disposed arms or supports 4. This frame and the rest of the apparatus are protected by a suitable casing 5, having a door 5ª. The receptacle 6, having a removable lid or cover 7 and a locking mechanism 8, as shown, is in the form of a savings-bank; but I do not limit myself to this particular form of receptacle nor to the construction of the framework as above described.

The casing of the bank is provided with an opening or slit 9, through which a key 10 of the apparatus is designed to enter to actuate the locking mechanism. This key is maintained in the desired position in an opening cut in the supporting member 3 and is so arranged as to have a slight longitudinal movement in relation to the support.

Carried on a pivot-rod 11, which rod in turn is supported by the arms 4, I employ two similar angular levers 12, each having a pressing or bearing surface 13, adapted to make contact with and bear upon the upper surface of the lid or cover during the operation of locking the receptacle. These angular levers 12 are connected at their forward or lower ends by a rod 14, and 15 is another cross-rod mounted in and also connecting said levers.

Extending downwardly from the casing and having their lower ends joined to collars on rod 15 are two coiled springs 16. These springs exert an upward pull upon the angular levers 12 and maintain the levers in an operative position. A hook-pawl 17, having one end attached to rod 15, is arranged to engage with the teeth of a ratchet 18. Ratchet 18 and a cam 19 are carried on a shaft 20, which latter is mounted in supports 21.

22 represents a stop-arm in contact with the cam 19. This arm is provided with a shoulder or projecting part 23, arranged to control the downward movement of a notched engaging arm 24 of a lifting mechanism. The lifting mechanism, as shown, is hung on a cross-rod 25, connecting the two arms or supports 4, and comprises in addition to arm 24 two similar bars 26, a gripping device 27, a flat spring 28, and a stop-lever 29. The flat spring 28 is passed under cross-rod 25, over a collar on a rod 30, under bolt 31, and bears upon the upper surface of the gripping device 27. Gripping device 27 is provided with a slot 32 and is loosely mounted on a cross-rod 32ª, connecting bars 26, and is provided with a spring 33 and two inwardly-projecting flanges 34. The forward end of the notched engaging arm 24 is joined to rod 30 and passes under cross-rod 25. Arm 24 is provided with notches 35 and 36, respectively arranged to engage with rod 15 and the projecting part 23 of the stop-arm 22.

The removable cover of the receptacle used in connection with the apparatus above described has a strip or plate 37 corresponding in width to the interior of the gripping device 27, under which the flanges 34 slide when the receptacle is placed in the apparatus. A guide 38 is employed on the supporting member 3, and 39 is a spring connecting the guide and the hook-pawl 17. The casing is provided with guides and lugs 40 and 41, arranged to properly guide the receptacle into the desired position during the operation of unlocking and locking.

Figs. 10 and 11 show means in conjunction with the apparatus whereby receptacles varying in size may be employed, and in these figures I show a smaller receptacle than the receptacle 6. When a receptacle corresponding in size to 6 is used, the adjusting mechanism is lowered into a cut-out in the base 1. The adjusting mechanism shown comprises four toggle-joint levers 42, joined together by rods 43. The latter in turn are connected by a handle-bar 44. Levers 42 are fastened at their upper ends to a platform 45 and their lower ends connected with a slide 46, running in guides 47.

In Fig. 1 I have shown the position of the parts of the apparatus just prior to the operation of unlocking and removing the lid or cover from the receptacle. In this position an inward movement of the receptacle causes the gripping device 27 to engage with and slide along plate 37 on the receptacle, and the angular levers 12 to move downwardly and backwardly against the resistance of coiled springs 16 and key 10 to enter the locking mechanism for the purpose of unlocking the lid. This movement of the levers causes the notched engaging arm 24 to descend with the cross-rod 15 and the notch 35 to engage with said rod. During this movement the cam 19 and the stop-arm 22, with its projection 23, are in such a position as to permit the notch 36 to register with projection 23. Hook-pawl 17 is carried with cross-rod and engages with ratchet 18. After the angular levers are moved to the limit of their backward travel the lid of the receptacle now being unlocked is ready to be lifted from the receptacle. This lifting operation is performed by withdrawing the receptacle from the apparatus, thereby permitting the coiled springs 16 to move the angular levers forwardly and upwardly. At the same time the hook-pawl 17 being in engagement with ratchet 18 turns the ratchet together with cam 19 and raises stop-arm 22 and its projection. While the levers are moving forward, the notched engaging arm 24 being in engagement with cross-rod 15 is of course carried with the levers, and this movement of the engaging arm is communicated to the lifting mechanism and the lid lifted free of the receptacle into the position clearly shown by Fig. 3. The contents of the receptacle are removed after the withdrawal of the receptacle from the apparatus. To replace this cover or lid on the receptacle and lock the same thereto the receptacle is again moved into the apparatus. This second inward movement of the receptacle against the angular levers permits the lifting mechanism to drop and deposit the lid on the receptacle and the key 10 to recede into the deep part of cam 19 and bearings 13 to press on the lid to lock the spring-lock. During the second inward movement of the receptacle or the backward movement of the levers the notched engaging arm 24 is released from engagement with cross-rod 15. The release of the arm 24 from rod 15 is accomplished by the raised position of the stop-arm 22 and its projection 23, the position of stop-arm being regulated by cam 19. During the locking and lid-replacing operation the bearing-surfaces 13 of the levers firmly press upon the cover. During the second withdrawal of the receptacle from the apparatus and the second forward movement of the angular levers the notch 35 of engaging arm 24 is raised out of engagement with rod 15. Consequently the lifting mechanism is not affected by this movement and remains down in the same position it assumed after replacing the lid or cover on the receptacle and locking it thereto. The angular levers are drawn forward to normal position by the action of coiled springs 16, and the parts of the apparatus are in the position shown by Fig. 1, ready to have another receptacle placed in the apparatus.

What I claim is—

1. The combination, with a receptacle provided with a lock and a lid or cover, of an apparatus comprising a key for unlocking the lid or cover, means for removing the lid or cover of the receptacle comprising an engaging device, and a lever for actuating the engaging device, said lever arranged in the path of travel of the receptacle.

2. The combination, with a receptacle provided with a lock and a lid or cover, of an apparatus for unlocking and removing the lid or cover of the receptacle comprising a key adapted to fit the lock, a device arranged to engage the lid or cover, means for raising and lowering the engaging device, said means actuated by moving the receptacle.

3. The combination, with a receptacle provided with a lock and a lid or cover, of an apparatus for unlocking, removing, replacing and locking the lid or cover of the receptacle, comprising a key adapted to fit the lock, a device for engaging the lid or cover arranged to remove said lid or cover from the receptacle and replace said lid or cover thereon, and means for actuating the engaging device comprising a pivotedly-mounted lever actuated by moving the receptacle.

4. The combination, with a receptacle provided with a lock and a lid or cover, of an apparatus comprising a key for actuating the lock, a lifting and replacing mechanism and means for actuating the lifting and replacing mechanism comprising a spring-actuated lever, a ratchet, and a pawl arranged to engage the ratchet.

5. The combination, with a receptacle provided with a lock and a lid or cover, of an apparatus comprising a key for actuating the lock, a lifting and replacing mechanism, and means for actuating the lifting and replacing mechanism comprising an angular lever, a ratchet, and a pawl arranged to engage the ratchet and to move with the angular lever.

6. The combination, with a receptacle provided with a lock and a lid or cover, of an apparatus comprising a key for actuating the lock, a lifting and replacing mechanism, an angular lever, a ratchet, a cam, and a pawl arranged to engage the ratchet for moving the cam.

7. The combination, with a receptacle provided with a lock and a removable lid, of an apparatus comprising a key for actuating the lock and a lifting mechanism, said lifting mechanism comprising a gripping device and an engaging arm, means for actuating the lifting mechanism comprising an angular lever, a ratchet, a pawl arranged to travel with the angular lever and to engage the ratchet, a cam, a stop-arm, said stop-arm moved by the cam and arranged to control the movement of the engaging arm.

8. The combination, with a receptacle provided with a lock and a removable lid, of an apparatus of the class described, comprising a key, a lifting and replacing mechanism and means for actuating the lifting and replacing mechanism, having two similar angular levers, coiled springs for moving the levers, a ratchet, a pawl carried with the levers and adapted to engage with the ratchet, a cam arranged to be turned by the ratchet, and a top-arm in contact with the cam.

9. The combination, with a receptacle provided with a lock and a removable lid, of an apparatus for unlocking and removing the lid from the receptacle, comprising an angular lever, a spring attached to the lever, a key adapted to actuate the lock, a lifting mechanism provided with means for engaging the lid, means carried with the lifting mechanism adapted to engage the lever upon the backward travel of the lever, whereby upon the forward movement of the lever the lifting mechanism is raised.

10. The combination, with a receptacle provided with a lock and a removable lid, of an apparatus for locking and replacing the lid upon the receptacle, comprising an angular lever, a spring attached to the lever, a lifting mechanism, means engaging the lifting mechanism and the lever, and means for disengaging the engaging means and the lever.

11. In a lifting apparatus, the combination, with the lifting mechanism, of means for actuating the lifting mechanism, comprising an angular lever, a member connecting the lifting mechanism and the angular lever, and a spring for normally maintaining the angular lever in an operative position.

In testimony whereof I have signed my name to this specification in the presence of two subscribing witnesses.

JOSEPH W. STEPHENS.

Witnesses:
MARGARET HUGHES,
W. G. DOOLITTLE.